United States Patent
Nagasaki

(10) Patent No.: US 8,368,804 B2
(45) Date of Patent: Feb. 5, 2013

(54) IMAGING CONTROL APPARATUS, IMAGING CONTROL METHOD, AND COMPUTER-READABLE STORAGE MEDIUM

(75) Inventor: Katsuhiko Nagasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 707 days.

(21) Appl. No.: 12/496,923

(22) Filed: Jul. 2, 2009

(65) Prior Publication Data

US 2010/0013955 A1    Jan. 21, 2010

(30) Foreign Application Priority Data

Jul. 16, 2008   (JP) ................. 2008-185290

(51) Int. Cl.
  *H04N 5/238* (2006.01)
  *H04N 5/235* (2006.01)
  *H04N 5/228* (2006.01)
  *H04N 9/73* (2006.01)

(52) U.S. Cl. .......... 348/364; 348/221.1; 348/222.1; 348/224.1; 348/229.1; 348/362; 348/363

(58) Field of Classification Search .......... 348/207.99, 348/220.1, 221.1, 222.1, 224.1, 229.1, 230.1, 348/231.99, 234, 235, 236, 237, 238, 241, 348/254, 255, 317, 320, 321, 322, 323, 324, 348/362, 363, 364
See application file for complete search history.

(56) References Cited

U.S. PATENT DOCUMENTS

| | | | |
|---|---|---|---|
| 2004/0165091 A1* | 8/2004 | Takemura et al. | 348/296 |
| 2004/0201730 A1* | 10/2004 | Tamura | 348/229.1 |
| 2005/0030411 A1* | 2/2005 | Aoyagi et al. | 348/362 |
| 2005/0093886 A1 | 5/2005 | Kubota | 345/619 |
| 2005/0271379 A1* | 12/2005 | Lee | 396/234 |
| 2008/0231728 A1* | 9/2008 | Asoma | 348/229.1 |

FOREIGN PATENT DOCUMENTS

| | | |
|---|---|---|
| JP | 60-242776 | 12/1985 |
| JP | 2002-320137 | 10/2002 |
| JP | 2005-197952 A | 7/2005 |

* cited by examiner

*Primary Examiner* — Chieh M Fan
*Assistant Examiner* — Peter Chon
(74) *Attorney, Agent, or Firm* — Fitzpatrick, Cella, Harper & Scinto

(57) ABSTRACT

An imaging control apparatus inputs an image signal from an image sensing unit, controls, based on a first image signal from the image sensing unit for a first region, a mechanical component which controls an aperture for image sensing by the image sensing unit, and electronically controls, based on the first image signal and a second image signal from the image sensing unit for a second region, the image luminance represented by an output from the image sensing unit for the second region.

12 Claims, 16 Drawing Sheets

FIG. 11
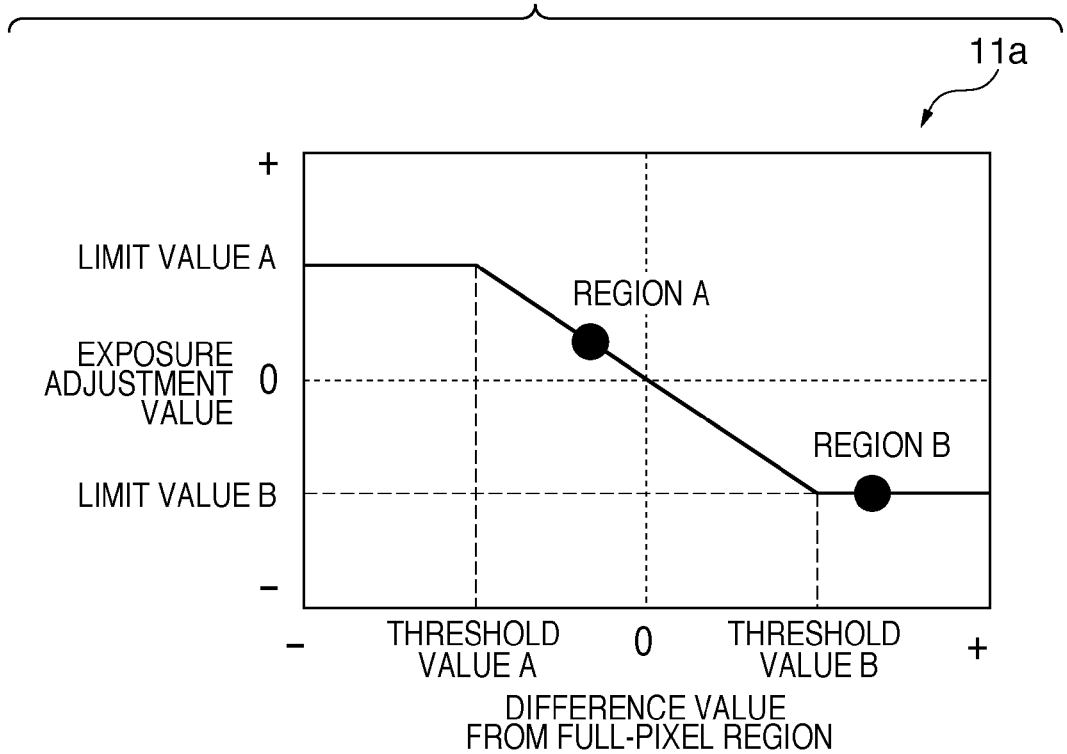
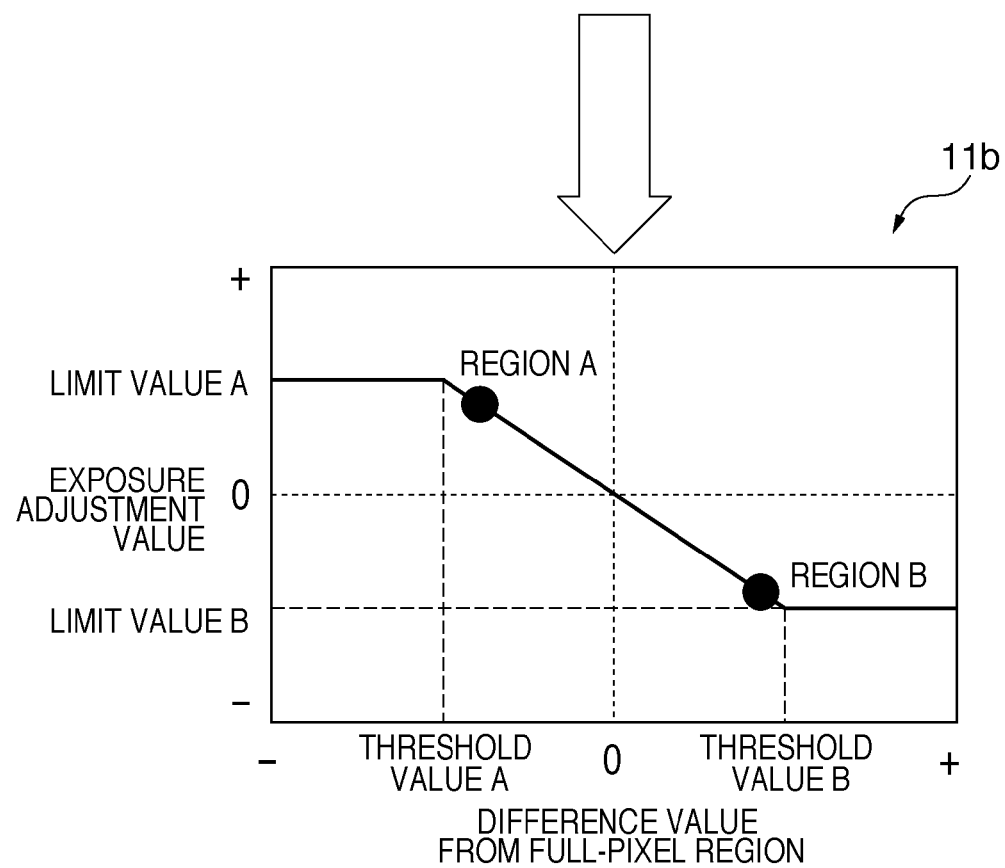

FIG. 13
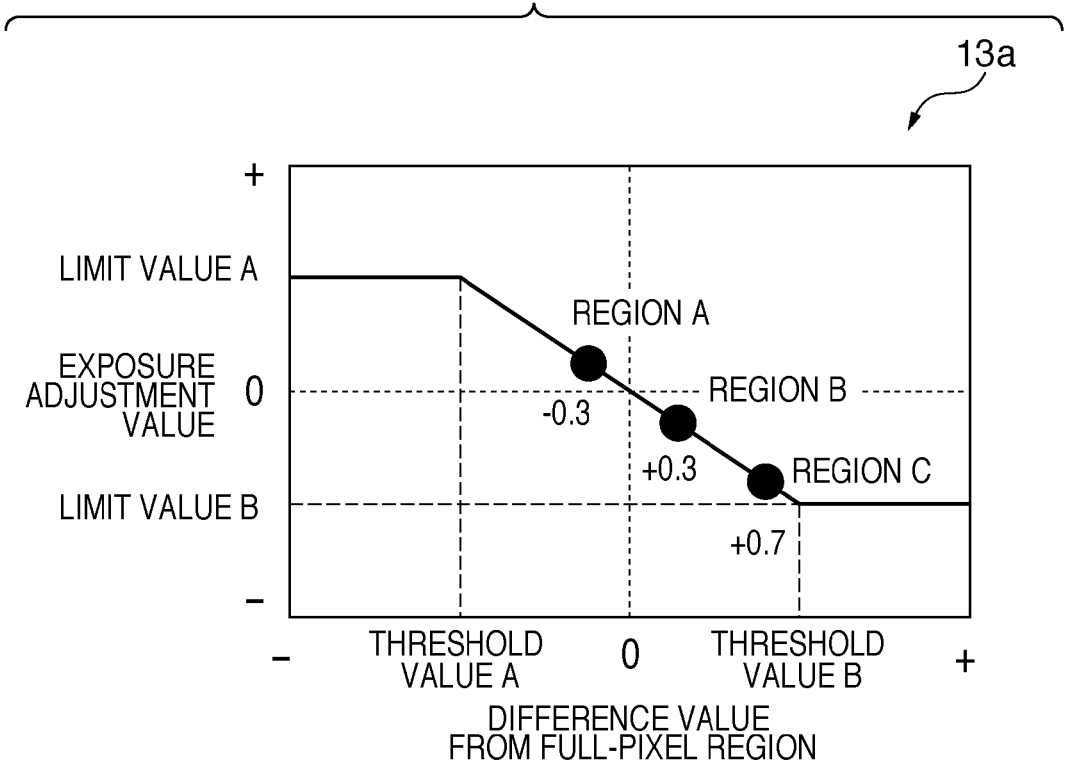
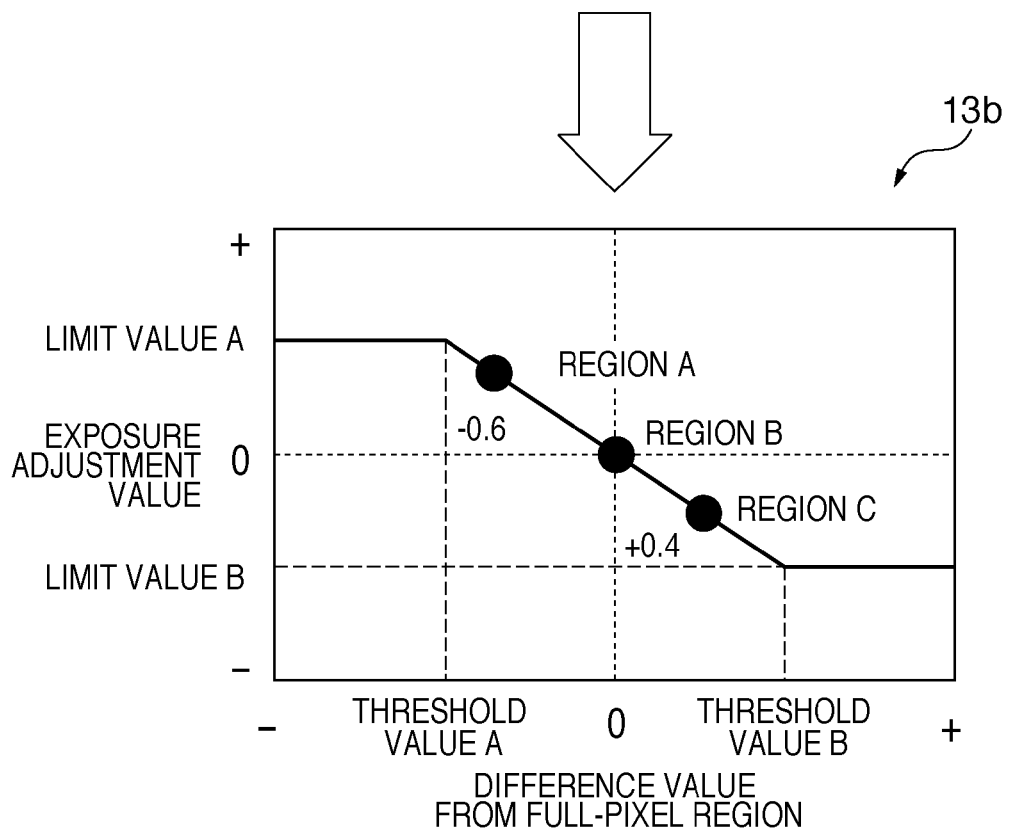

FIG. 14
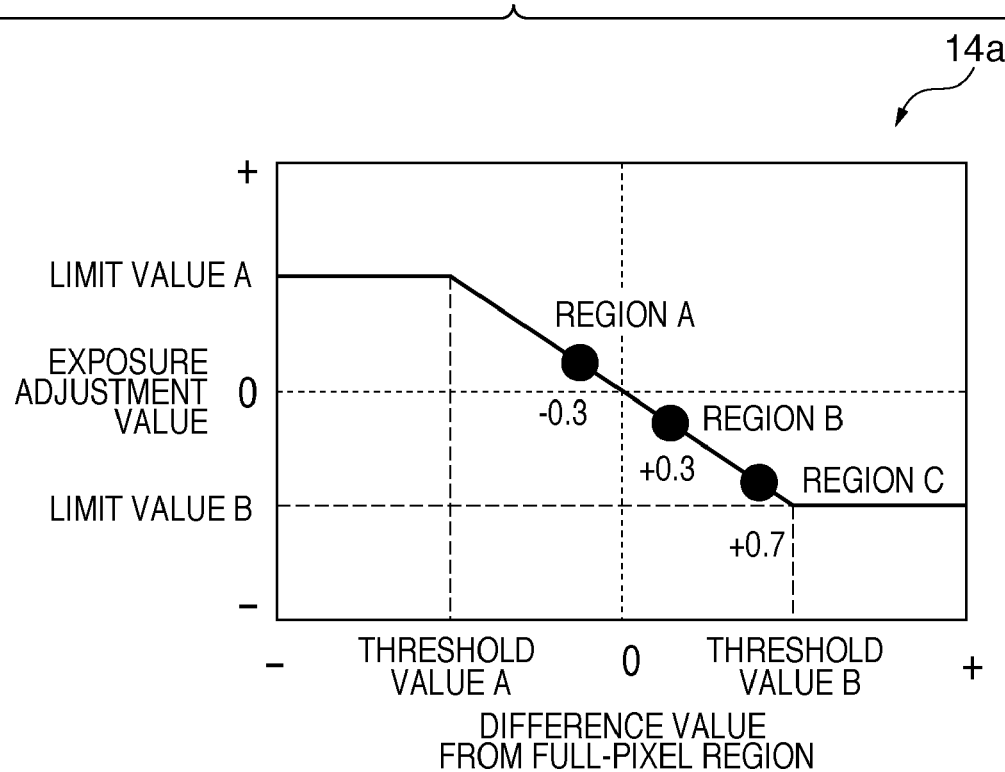
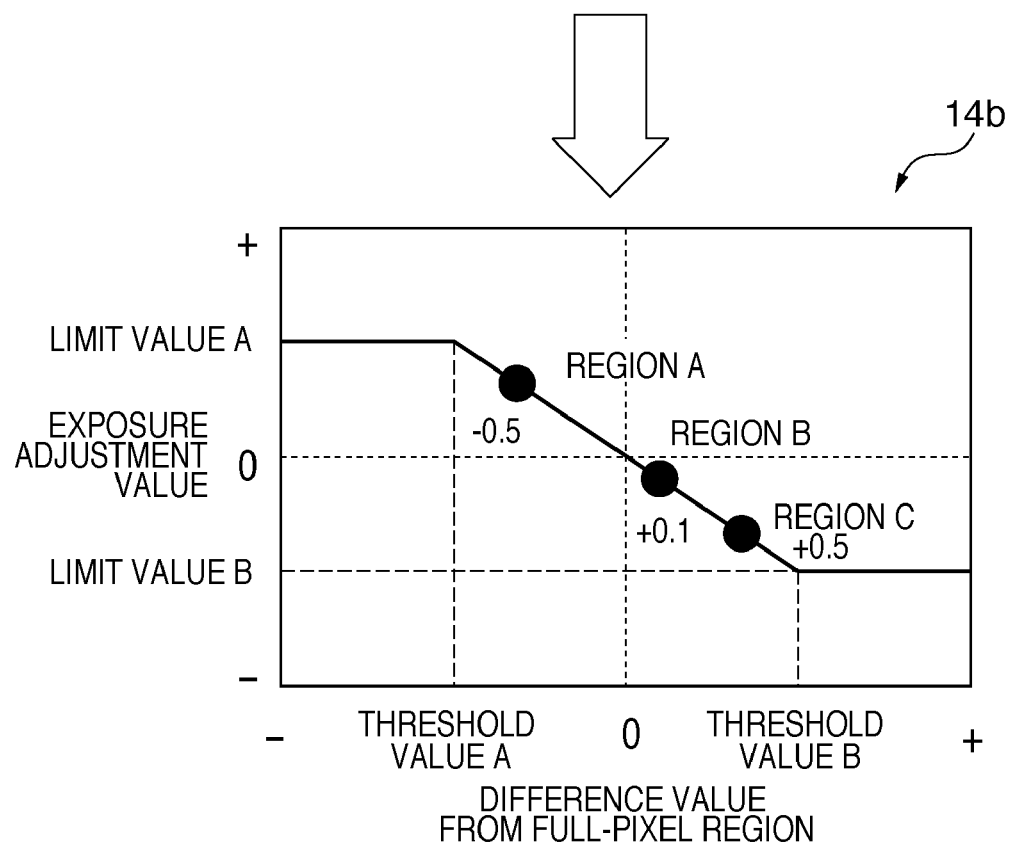

FIG. 16
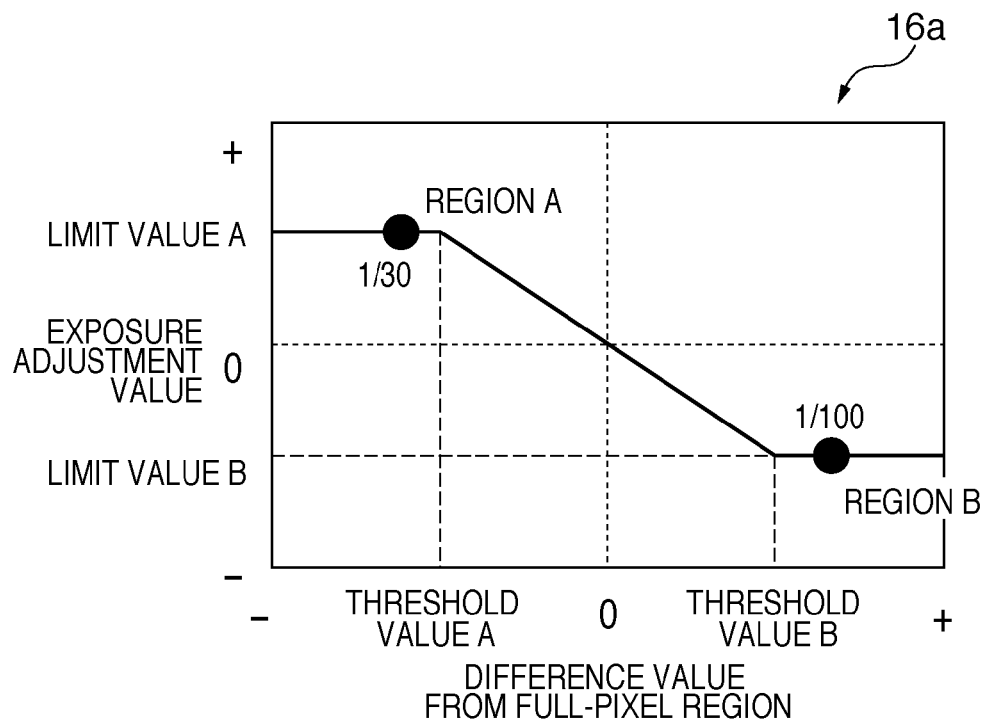
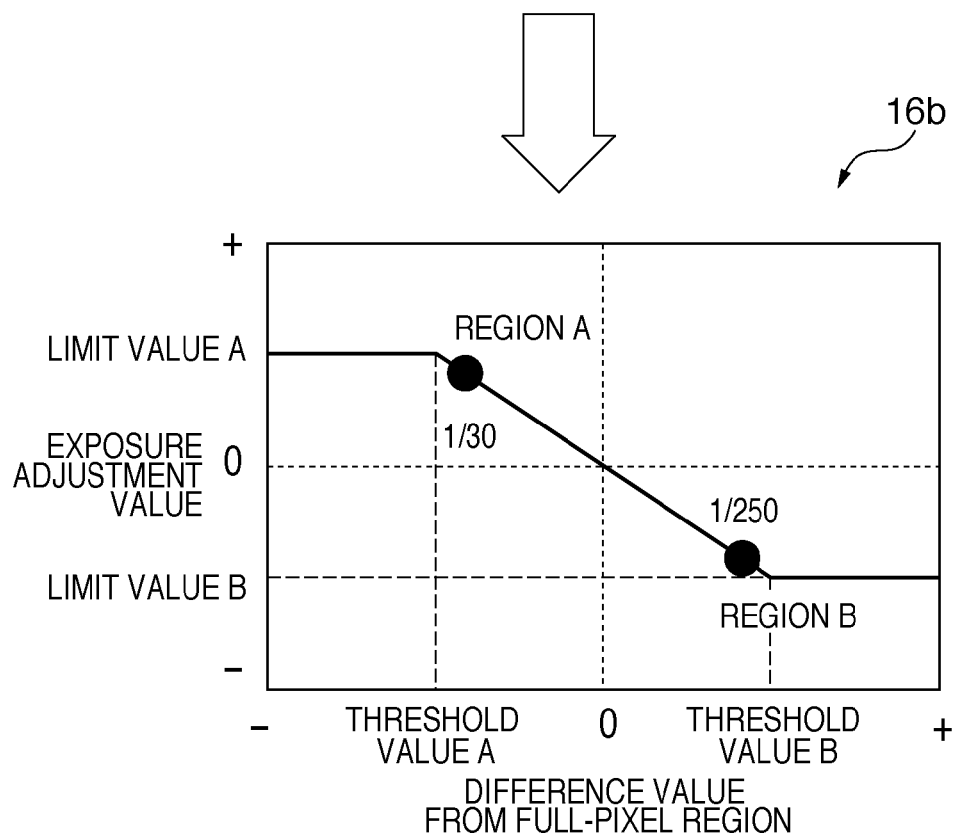

IMAGING CONTROL APPARATUS, IMAGING CONTROL METHOD, AND COMPUTER-READABLE STORAGE MEDIUM

BACKGROUND OF THE INVENTION

1. Field of the Invention

The present invention relates to an imaging control apparatus, imaging control method, and computer-readable storage medium.

2. Description of the Related Art

There has been proposed a technique which extracts a plurality of regions from one sensed image, performs processes such as luminance correction in each region, and composites the regions into one image, thereby obtaining appropriate exposure in the overall image and each extracted image (U.S. Patent Publication No. 2005/093886).

Another proposed technique obtains exposure in an entire image by performing weighted averaging for the photometric value of each divided image and deriving the photometric value of the overall image (Japanese Patent Laid-Open No. 2002-320137). Still another technique has also been proposed which suppresses the level of a signal at a predetermined level or more in an image, thereby obtaining an image in appropriate exposure even in a partial region (Japanese Patent Laid-Open No. 60-242776).

However, the above-described techniques have various problems. For example, the technique described in U.S. Patent Publication No. 2005/093886 puts a load on the extraction and compositing processes, and a real-time process is difficult. Even if the real-time process is possible, the process load is enormous. The technique described in Japanese Patent Laid-Open No. 2002-320137 obtains only the exposure value of the entire image but no optimum image in each partial region. The technique described in Japanese Patent Laid-Open No. 60-242776 cannot obtain an image in appropriate exposure in each designed partial region.

SUMMARY OF THE INVENTION

The present invention provides a technique of quickly adjusting the image luminance in each region.

According to a first aspect of the present invention, there is provided an imaging control apparatus comprising: an input unit configured to input an image signal from an image sensing unit; an aperture control unit configured to control, based on a first image signal from the image sensing unit for a first region, a mechanical component which controls an aperture for image sensing by the image sensing unit; and a luminance control unit configured to electronically control, based on the first image signal and a second image signal from the image sensing unit for a second region, an image luminance represented by an output from the image sensing unit for the second region.

According to a second aspect of the present invention, there is provided an imaging control method of an imaging control apparatus, comprising: inputting an image signal from an image sensing unit; controlling, based on a first image signal from the image sensing unit for a first region, a mechanical component which controls an aperture for image sensing by the image sensing unit; and electronically controlling, based on the first image signal and a second image signal from the image sensing unit for a second region, an image luminance represented by an output from the image sensing unit for the second region.

According to a third aspect of the present invention, there is provided a computer-readable storage medium storing a computer program for imaging control, the program comprising: controlling, based on a first image signal from an image sensing unit for a first region, a mechanical component which controls an aperture for image sensing by the image sensing unit; and electronically controlling, based on the first image signal and a second image signal from the image sensing unit for a second region, an image luminance represented by an output from the image sensing unit for the second region.

Further features of the present invention will become apparent from the following description of exemplary embodiments with reference to the attached drawings.

BRIEF DESCRIPTION OF THE DRAWINGS

FIG. 11 is a graph showing an example of the outline of exposure control;

FIG. 13 is a graph showing an example of the outline of exposure control;

FIG. 14 is a graph showing an example of the outline of exposure control;

FIG. 16 is a graph showing an example of the outline of exposure control.

DESCRIPTION OF THE EMBODIMENTS

Preferred embodiments of the present invention will now be described in detail with reference to the accompanying drawings. It should be noted that the relative arrangement of the components, the numerical expressions and numerical values set forth in these embodiments do not limit the scope of the present invention unless it is specifically stated otherwise.

Figure 1:
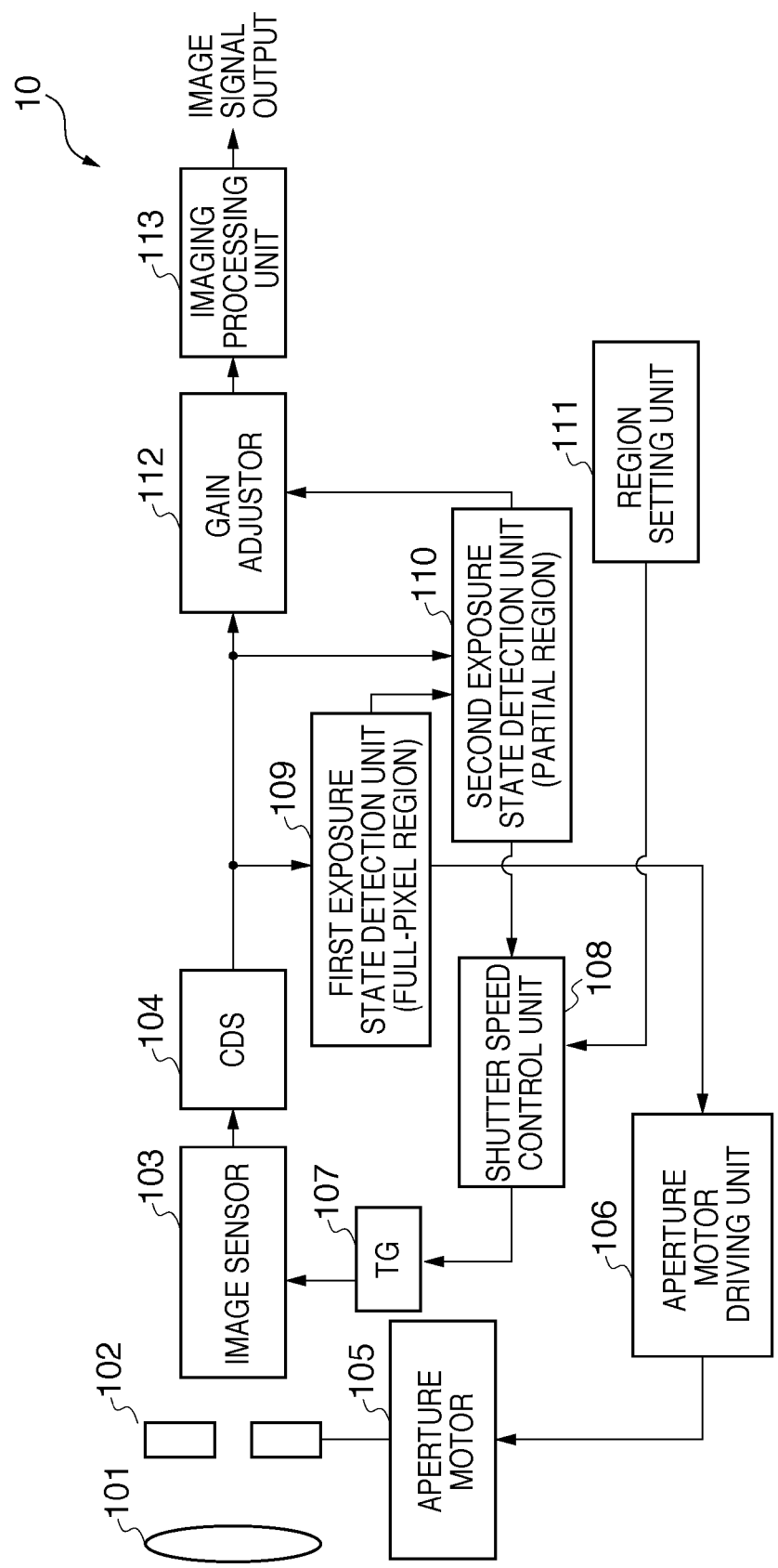
FIG. 1 is a block diagram showing an example of the arrangement of an image sensing apparatus 10 according to an embodiment.

FIG. 1 is a block diagram showing an example of the arrangement of an image sensing apparatus 10 according to an embodiment.

Reference numeral 101 denotes a lens; and 102, an aperture unit (an iris unit) which is mechanically controlled. An image sensor 103 is formed from, for example, a CMOS (Complementary Metal Oxide Semiconductor) sensor. A CDS (Correlated Double Sampling) 104 processes a signal from the image sensor 103 and outputs it as an image signal (input image). An aperture motor 105 controls the aperture unit 102. An aperture motor driving unit 106 drives and controls the aperture motor 105.

A TG (Timing Generator) 107 controls the timing of the image sensor 103. A shutter speed control unit 108 controls the speed of an electronic shutter. Shutter speed control is done by controlling the TG 107. Note that the electronic shutter has a function of adjusting the time during which the image sensor 103 receives light. A first exposure state detection unit 109 detects the exposure state of an overall input image. A second exposure state detection unit 110 detects the exposure state of a partial region in the image. A region setting unit 111 divides an input image and sets one or more partial regions in the input image. A gain adjustor 112 adjusts the gain of the image signal. An imaging processing unit 113 performs various kinds of imaging processes.

The procedure of the image signal output process of the image sensing apparatus 10 will be described. The image sensing apparatus 10 first senses an object through the lens 101. Light becomes incident through the lens 101 and the aperture unit 102 so that the object light forms an image on the image sensor 103. The object light formed into an image is output from the image sensor 103 as an electrical signal and input to the CDS 104. The electrical signal is output as an image signal via the gain adjustor 112 and the imaging processing unit 113.

Figure 2:
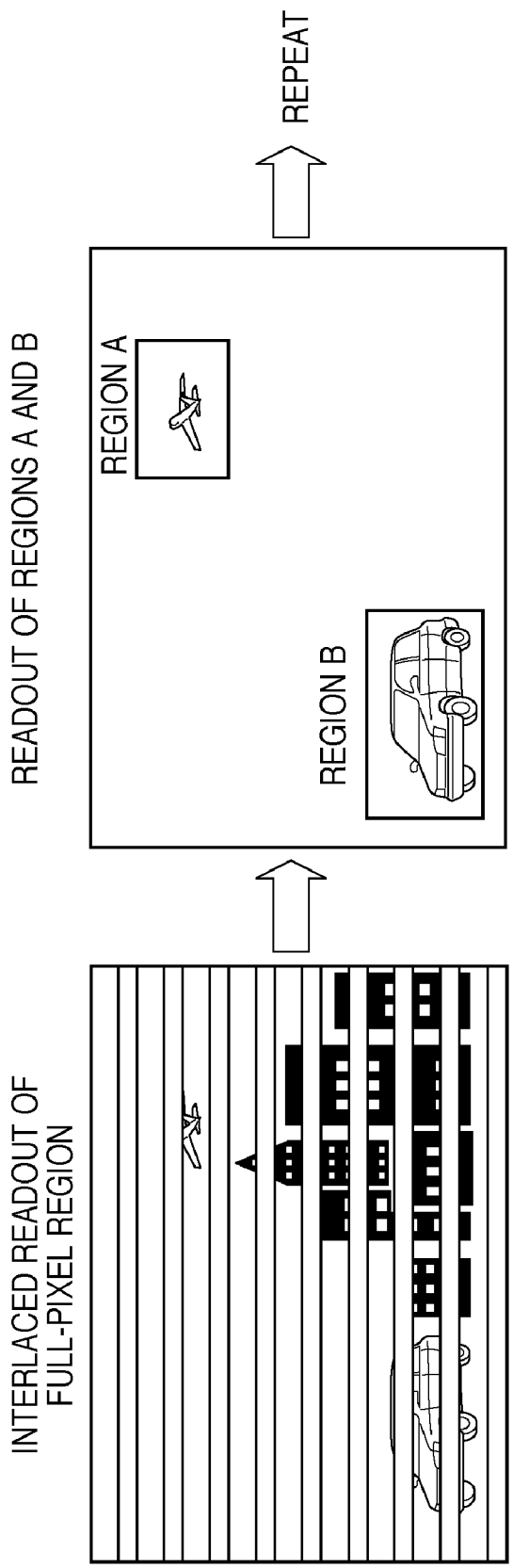
FIG. 2 is a view showing an example of the image readout operation of the image sensing apparatus 10 shown in FIG. 1.

When partial region readout or interlaced readout (to be referred to as full-pixel region readout hereinafter) is set, the region setting unit 111 sends the setting information to the shutter speed control unit 108. At this time, the image sensing apparatus 10 controls the image sensor 103 via the TG 107 and outputs only the signal of the set region. The image sensing apparatus 10 repeatedly executes the above process at a predetermined time interval, thereby generating a moving image. In this embodiment, an example will be explained in which interlaced readout and readout of a plurality of partial regions (regions A and B) are repeatedly executed based on the setting of the region setting unit 111, as shown in FIG. 2.

An example of the arrangement of the image sensing apparatus 10 has been described above. Note that the image sensing apparatus 10 incorporates one or a plurality of computers to control the entire image sensing apparatus 10 or its units. A computer includes a main control unit such as a CPU and storage units such as a ROM (Read Only Memory), RAM (Random Access Memory), and HDD (Hard Disk Drive). The computer also includes input/output units such as operation buttons, display, and touch panel, and a communication unit such as a network card. These constituent elements are connected via, for example, a bus and controlled by causing the main control unit to execute programs stored in the storage units.

Figure 3:
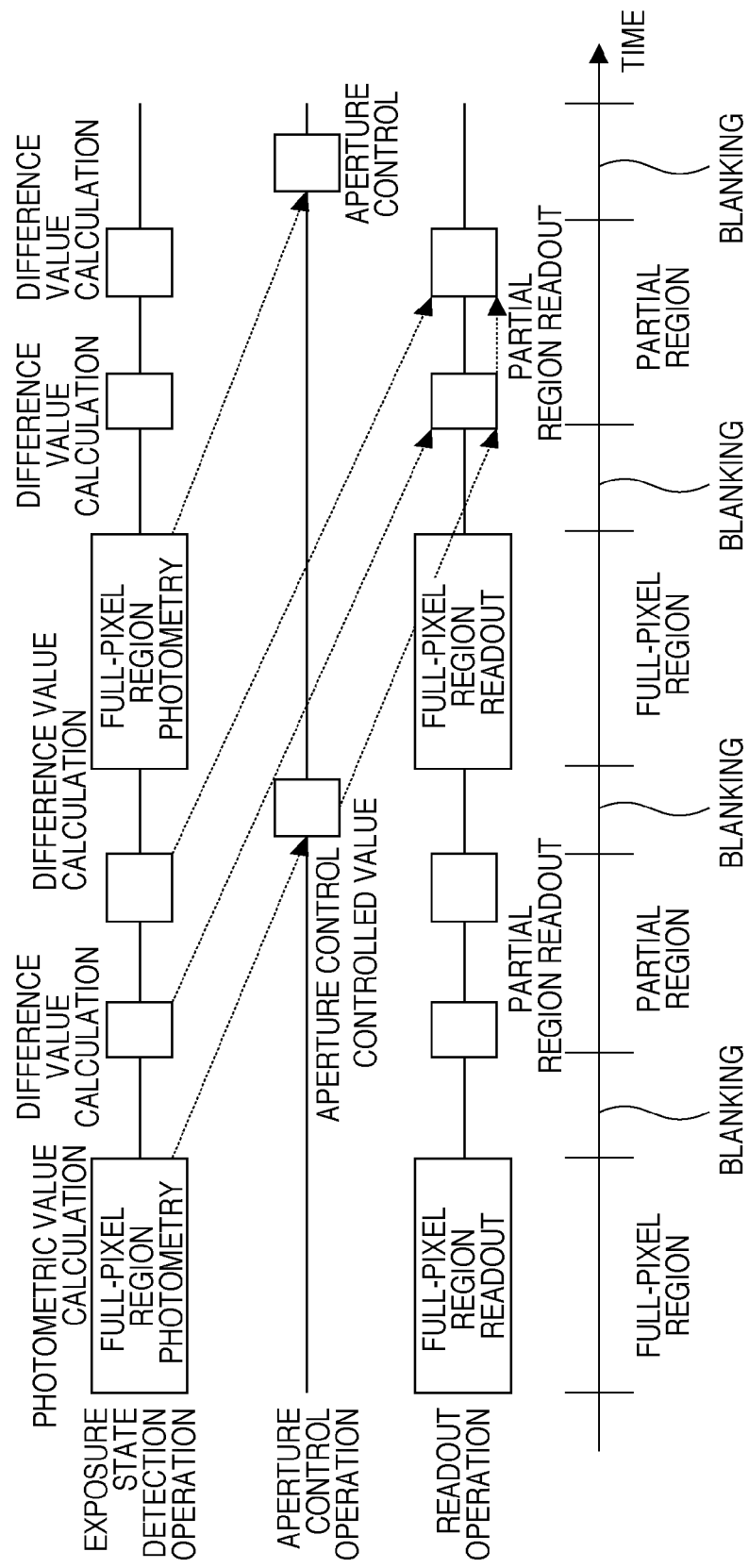
FIG. 3 is a timing chart showing an example of the operation timing of the image sensing apparatus 10 shown in FIG. 1.

FIG. 3 is a timing chart showing an example of the operation timing of the image sensing apparatus 10 shown in FIG. 1.

The image sensing apparatus 10 repeatedly performs a process for a full-pixel region (entire input image) and a process for partial regions while inserting blanking periods. The dotted lines in FIG. 3 represent the relationship between values to be used for control. In this case, a photometric value calculated in a full-pixel region photometry period is used for aperture control (iris control) of next time.

Figure 4:
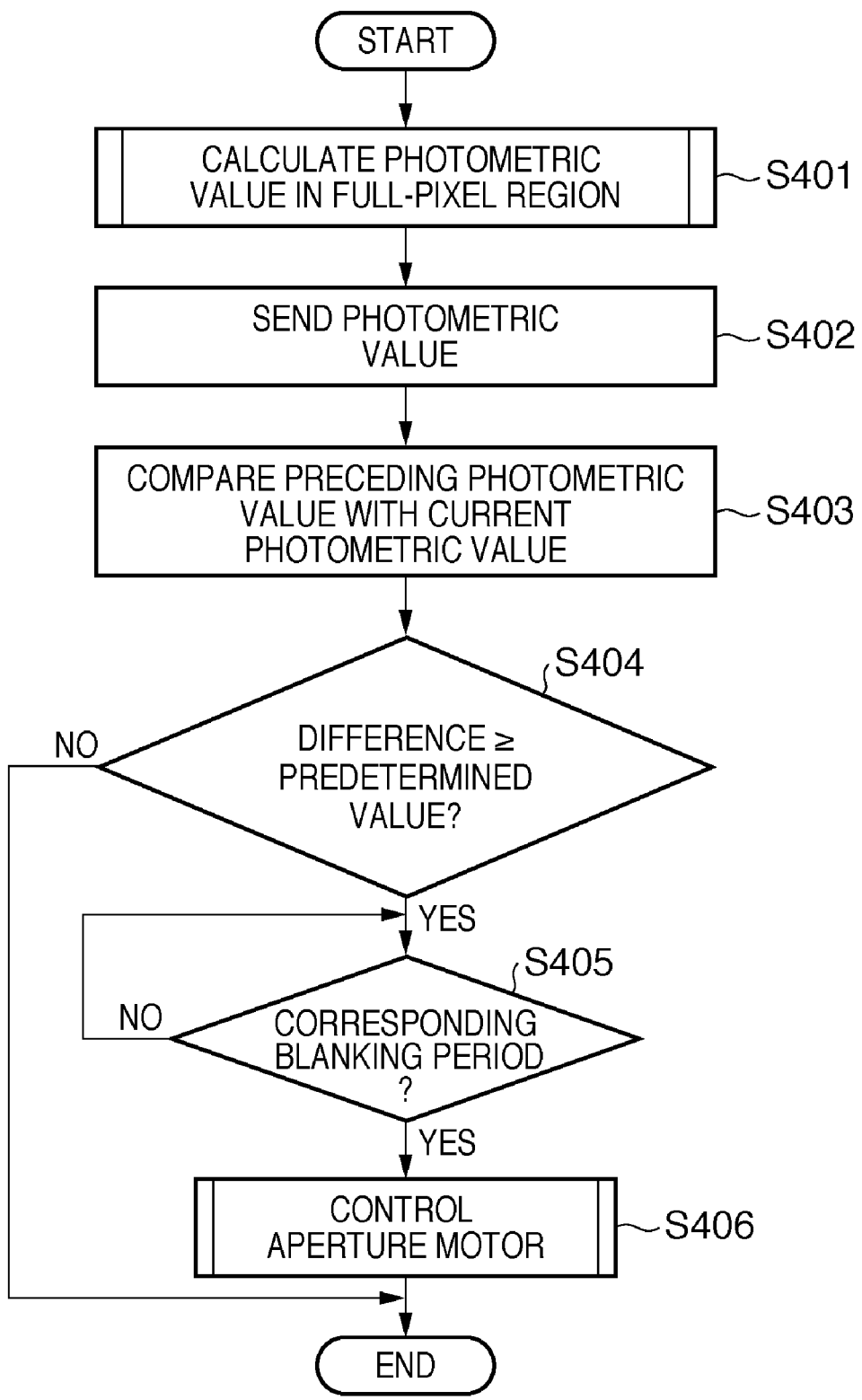
FIG. 4 is a first flowchart illustrating an example of the process sequence of the exposure control operation of the image sensing apparatus 10 shown in FIG. 1.
Figure 5:
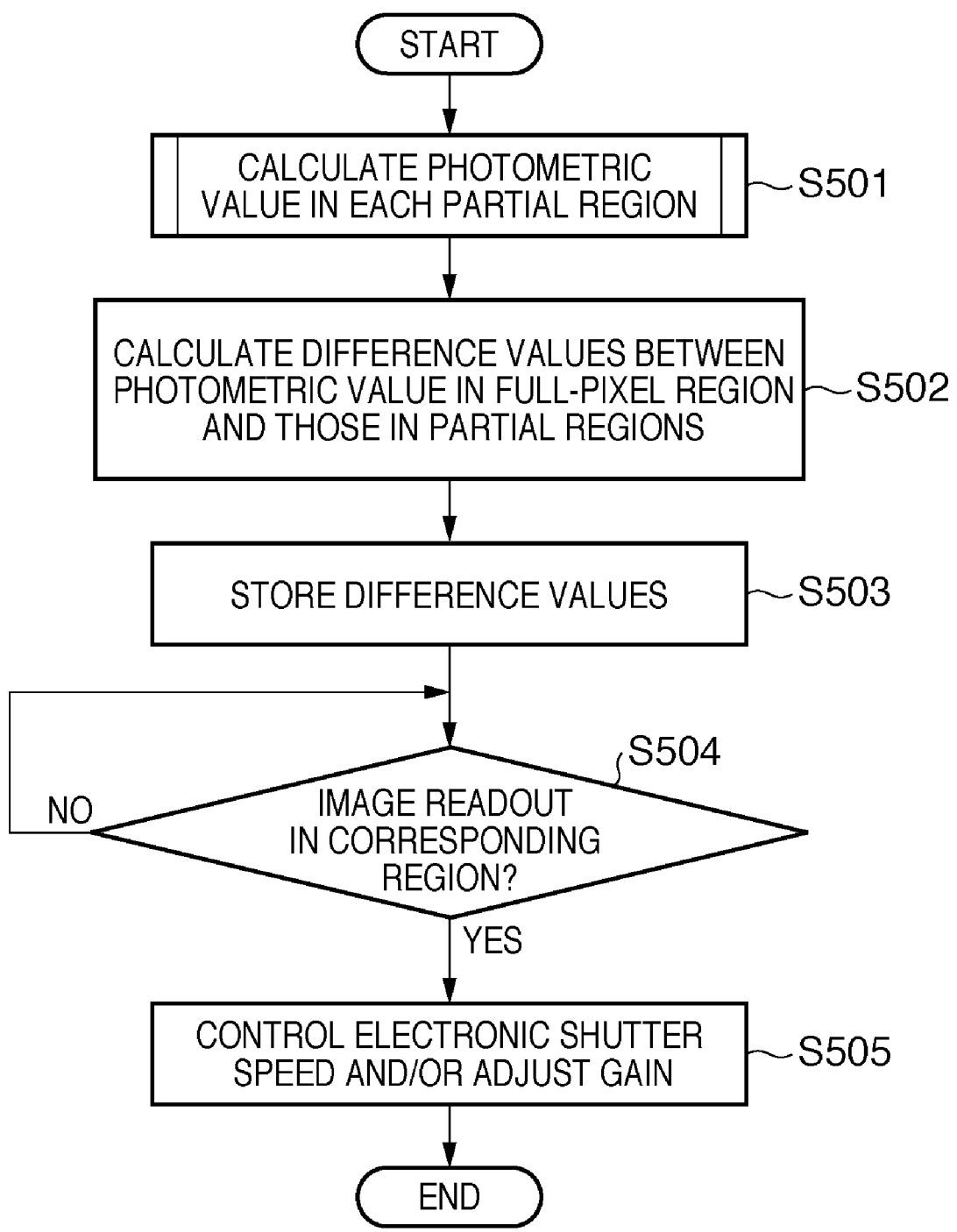
FIG. 5 is a second flowchart illustrating an example of the process sequence of the exposure control operation of the image sensing apparatus 10 shown in FIG. 1.

An example of the process sequence of the exposure control operation of the image sensing apparatus 10 shown in FIG. 1 will be described with reference to FIGS. 4 and 5.

The process sequence of an aperture control operation will be described first with reference to FIG. 4. This process is performed based on, for example, the photometric value in the full-pixel region calculated during a full-pixel region period in the timing chart of FIG. 3.

An electrical signal based on object light incident through the lens 101 and the aperture unit 102 is output from the image sensor 103 and input to the CDS 104. The process starts when the CDS 104 outputs a signal based on the received electrical signal. Note that the output signal from the CDS 104 is input to the gain adjustor 112 and the first exposure state detection unit 109. The region setting unit 111 sets full-pixel region readout in the shutter speed control unit 108. The shutter speed control unit 108 performs interlaced readout of the output from the image sensor 103 via the TG 107 and outputs signals in the full-pixel region.

When this process starts, the first exposure state detection unit 109 properly accumulates the input signals, thereby calculating the photometric value (exposure state detection value) in the full-pixel region (step S401). A known method is usable for photometric value calculation, and a description thereof will be omitted. The calculated photometric value is sent to the aperture motor driving unit 106 (step S402).

The aperture motor driving unit 106 stores the received photometric value in a storage unit (not shown) and compares it with an already stored preceding photometric value (step S403). The aperture motor driving unit 106 calculates the difference between the current and preceding photometric values. If the difference between them has a predetermined value or more (YES in step S404), the aperture motor driving unit 106 waits up to the blanking period after partial region readout (NO in step S405). When the blanking period starts (YES in step S405), the aperture motor driving unit 106 controls the aperture motor 105 to move the aperture unit 102 in accordance with the calculated photometric value such that an appropriate exposure state is obtained (step S406). The exposure state is corrected by the aperture control.

If the difference between the current and preceding photometric values is smaller than the predetermined value in step S404 (NO in step S404), the process ends without aperture motor control.

The process sequence of an image luminance control operation will be described next with reference to FIG. 5. This process is performed based on, for example, the photometric value in each partial region calculated during a partial region period in the timing chart of FIG. 3.

An electrical signal based on object light incident through the lens 101 and the aperture unit 102 is output from the image sensor 103 and input to the CDS 104. The process starts when the CDS 104 outputs a signal based on the received electrical signal. Note that the output signal from the CDS 104 is input to the gain adjustor 112 and the second exposure state detection unit 110. The region setting unit 111 sets partial region readout in the shutter speed control unit 108. The shutter speed control unit 108 controls the image sensor 103 via the TG 107 and outputs signals in the partial regions (regions A and B in FIG. 2) set by the region setting unit 111.

When this process starts, the second exposure state detection unit 110 properly accumulates the input signals for each partial region set by the region setting unit 111. The second exposure state detection unit 110 then calculates the photometric value (exposure state detection value) in each partial region as the exposure state detection result of each partial region (step S501). After that, the second exposure state detection unit 110 refers to the photometric value obtained by the first exposure state detection unit 109 and calculates the difference value between the photometric values (step S502). The difference value is stored in the storage unit (not shown) (step S503). The photometric value is stored for each partial region. At the next image readout timing of each partial region (YES in step S504), the second exposure state detection unit 110 controls at least one of the shutter speed control unit 108 and the gain adjustor 112 (step S505). The image luminance is adjusted by such electronic control (e.g., shutter speed control and gain adjustment).

Figure 6:
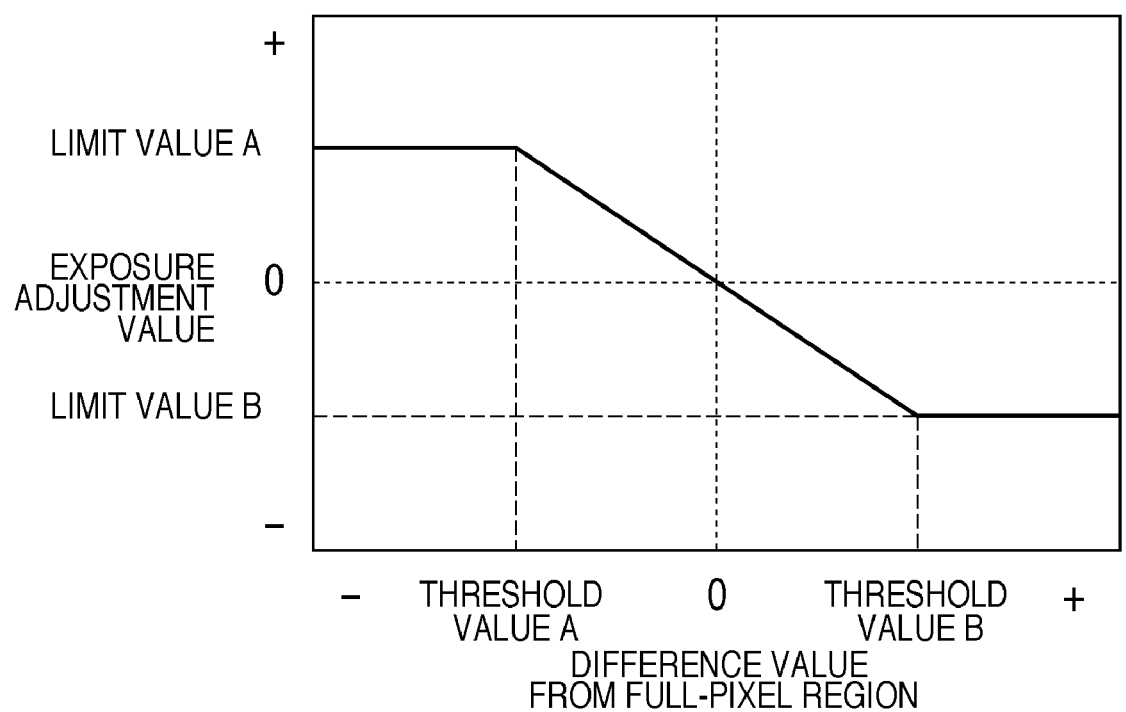
FIG. 6 is a graph showing an example of the outline of exposure control of the image sensing apparatus 10 shown in FIG. 1.

Note that if the difference value calculated in step S502 does not reach any threshold value stored in the storage unit (not shown), the second exposure state detection unit 110 adjusts the image luminance in proportion to the difference value in step S505. On the other hand, if the difference value falls outside the threshold value range, the second exposure state detection unit 110 adjusts the image luminance only up to a predetermined level that is set as an adjustment limitation, instead of adjusting it in proportion to the difference value. This aims at preventing degradation in image quality upon digital adjustment. This will be described in detail with reference to FIG. 6. FIG. 6 shows an example of the relationship between the difference value and the exposure adjustment value. Referring to FIG. 6, if the difference value does not reach either a threshold value A in the − direction or a threshold value B in the + direction, that is, if the difference value falls within the range between the two threshold values, the exposure adjustment value is adjusted in proportion to the difference value. If the difference value is equal to or smaller than the threshold value A or equal to or larger than the threshold value B, adjustment is done up to an adjustment limit value A corresponding to the threshold value A or an adjustment limit value B corresponding to the threshold value B.

As described above, it is possible to ensure satisfactory exposure for the image in each partial region while maintaining the same frame rate as before, and also prevent degradation in image quality.

The second embodiment will be described next. In the second embodiment, aperture control (iris control) is performed by feeding back a value (difference value) calculated by a second exposure state detection unit 110. Note that in the second embodiment, points different from the first embodiment will mainly be explained to prevent a repetitive description, and a description of the same parts may be omitted.

Figure 7:
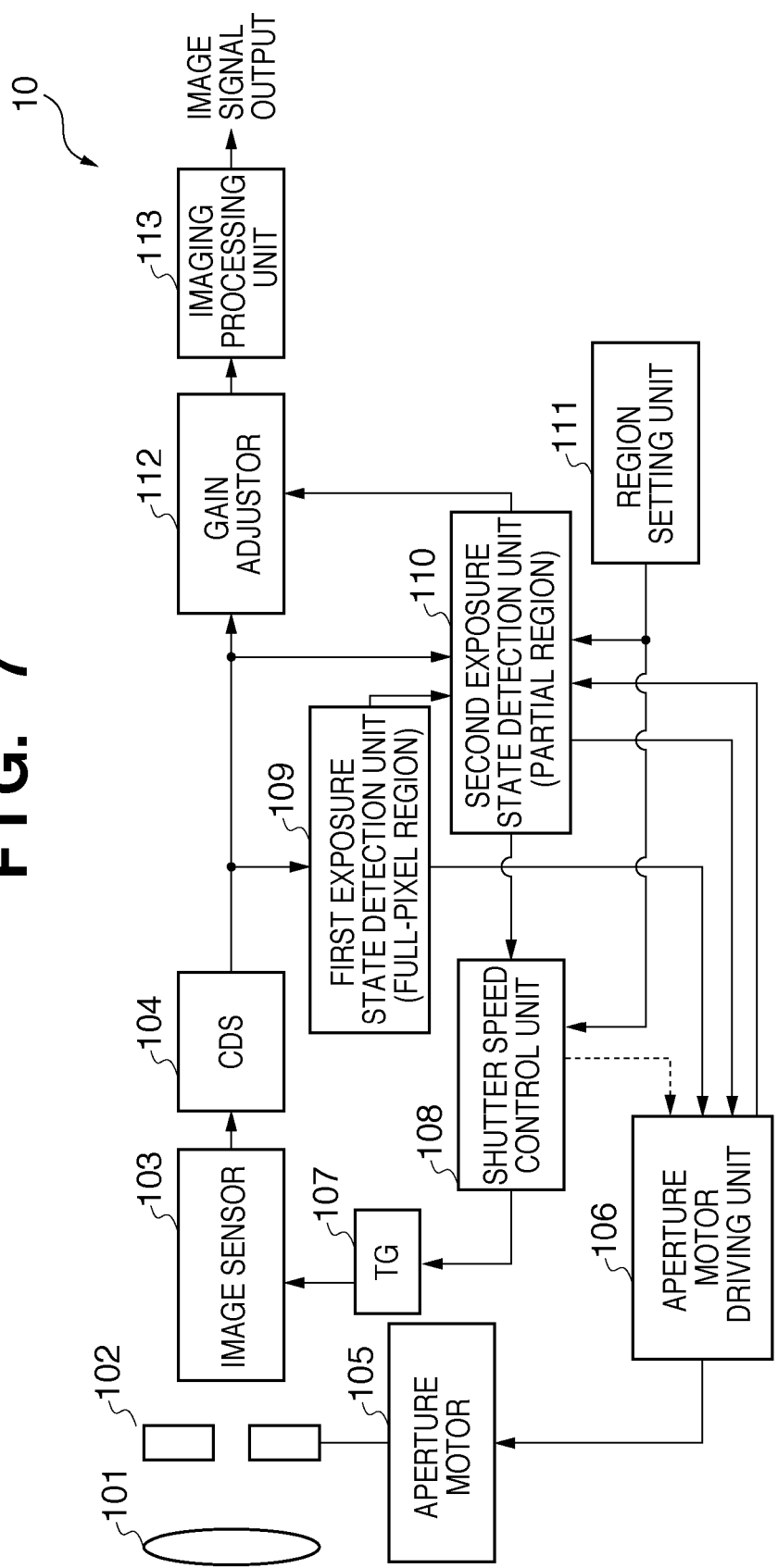
FIG. 7 is a block diagram showing an example of the arrangement of an image sensing apparatus 10.

FIG. 7 is a block diagram showing an example of the arrangement of an image sensing apparatus 10 according to the second embodiment. Unlike FIG. 1 used to describe the first embodiment, an aperture motor driving unit 106 and the second exposure state detection unit 110 exchange information, and a solid line indicating it is added. This information exchange allows the aperture motor driving unit 106 to perform aperture control by feeding back a value (difference value) calculated by the second exposure state detection unit 110.

Figure 8:
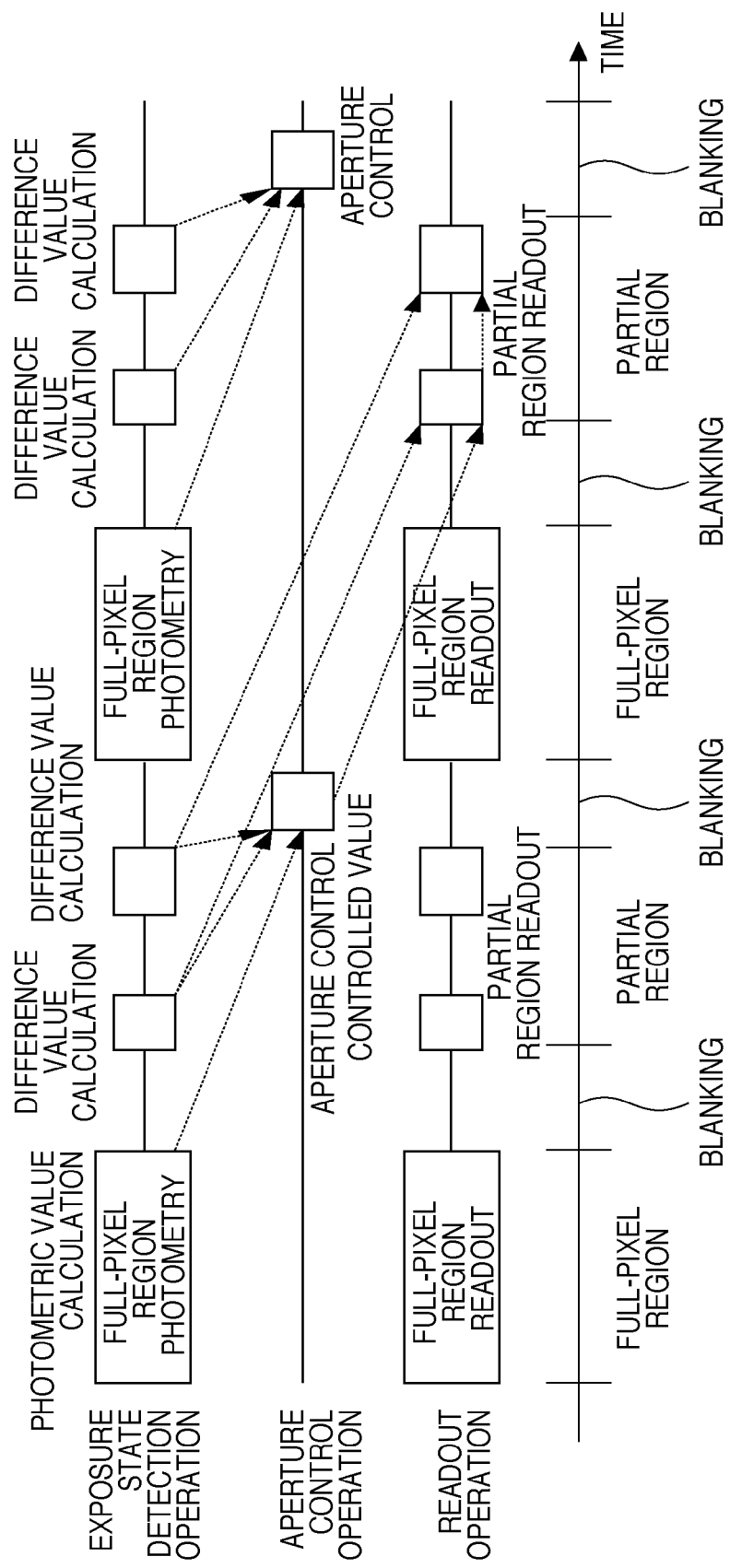
FIG. 8 is a timing chart showing an example of the operation timing of the image sensing apparatus 10.

FIG. 8 shows the operation timing of the image sensing apparatus 10 according to the second embodiment. Unlike the timing chart of FIG. 3 used to describe the first embodiment, FIG. 8 additionally includes dotted lines representing using the difference value for aperture control.

Figure 9:
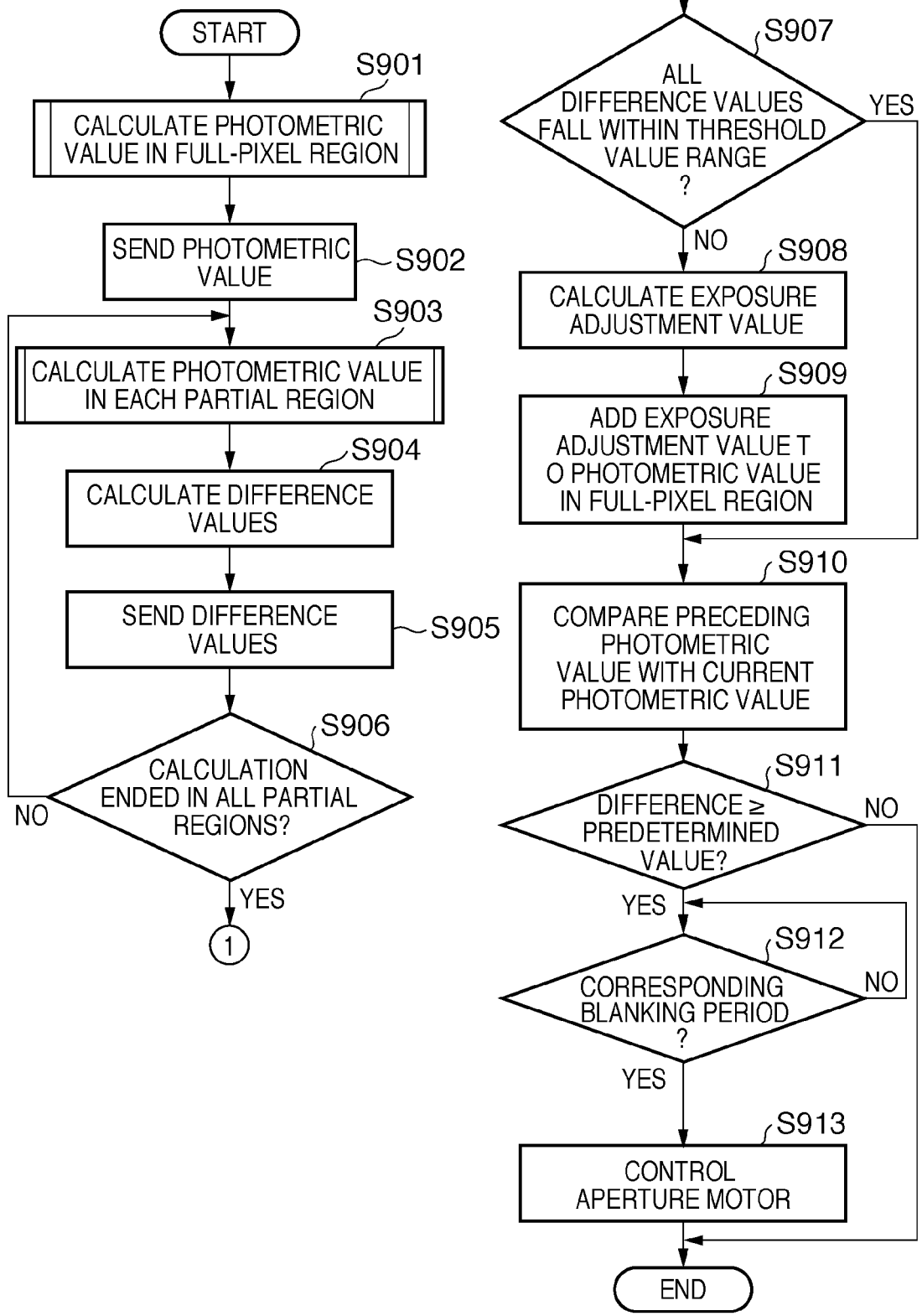
FIG. 9 is a first flowchart illustrating an example of the process sequence of the exposure control operation of the image sensing apparatus 10.
Figure 10:
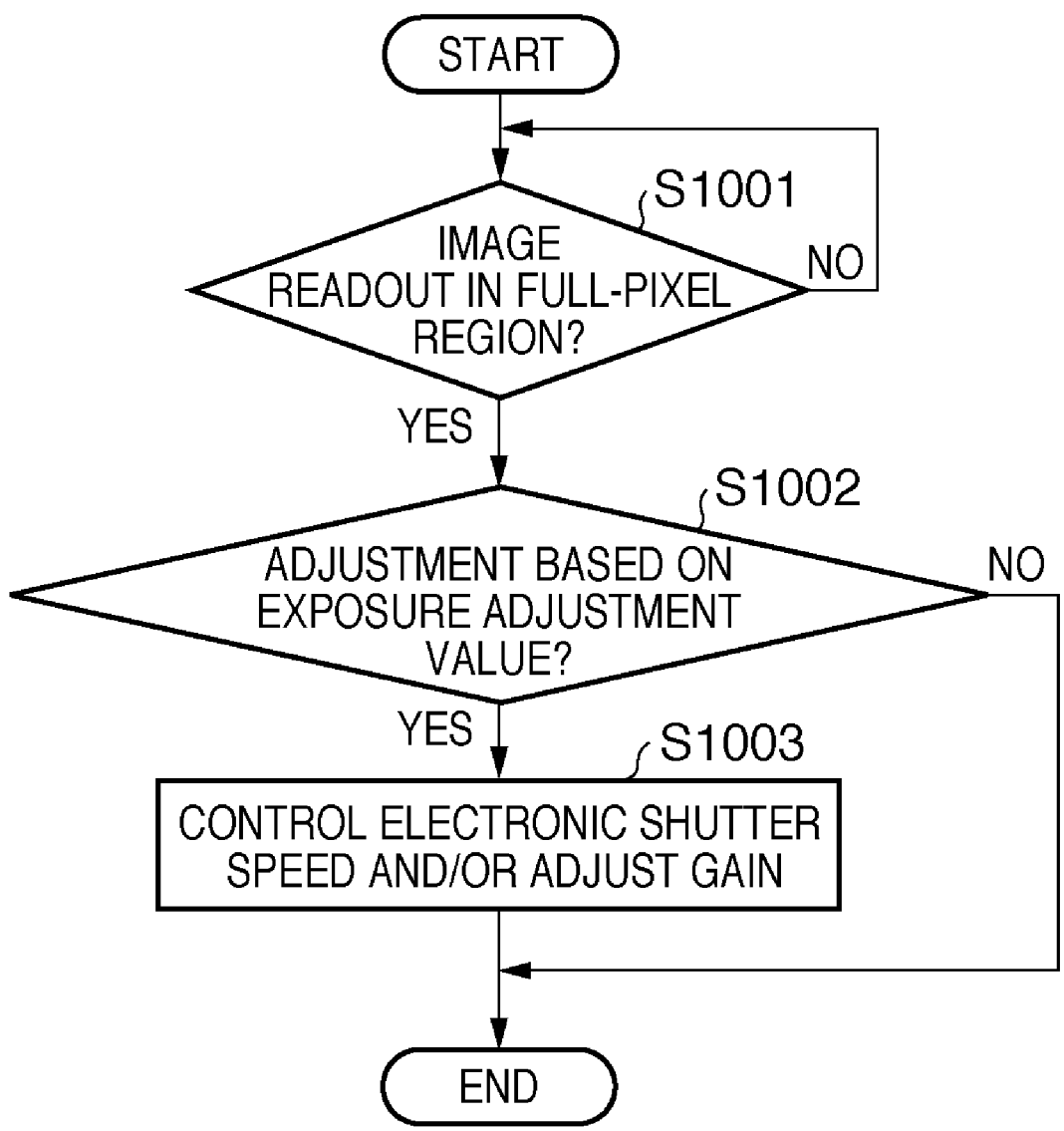
FIG. 10 is a second flowchart illustrating an example of the process sequence of the exposure control operation of the image sensing apparatus 10.

An example of the process sequence of an exposure control operation according to the second embodiment will be described next with reference to FIGS. 9 and 10. The process sequence of an aperture control operation will be described first with reference to FIG. 9.

The image sensing apparatus 10 first causes a first exposure state detection unit 109 to calculate the photometric value in the full-pixel region (step S901). The first exposure state detection unit 109 stores the calculated photometric value in a storage unit (not shown) and also sends it to the aperture motor driving unit 106 (step S902). The aperture motor driving unit 106 stores the received photometric value in a storage unit (not shown).

Next, the image sensing apparatus 10 causes the second exposure state detection unit 110 to calculate the photometric value in each partial region (step S903). After that, the second exposure state detection unit 110 refers to the photometric value in the full-pixel region obtained by the first exposure state detection unit 109 and calculates the difference value between the photometric value in the full-pixel region and that in each partial region (step S904). The second exposure state detection unit 110 stores the calculated difference value in the storage unit (not shown) and also sends it to the aperture motor driving unit 106 (step S905). The aperture motor driving unit 106 stores the received difference value in the storage unit (not shown). The second exposure state detection unit 110 repeatedly executes the process in steps S903 to S905 until the above-described calculation process has been performed for all partial regions (NO in step S906).

When the difference value calculation process has ended in all partial regions (YES in step S906), the aperture motor driving unit 106 determines whether all difference values stored in the storage unit (not shown) fall within a predetermined threshold value range. If at least one of the difference values falls outside the threshold value range (NO in step S907), an exposure adjustment value for the full-pixel region is calculated to make all difference values fall within the threshold value range (step S908).

Next, the aperture motor driving unit 106 adds the calculated exposure adjustment value to the photometric value in the full-pixel region calculated in step S901 (step S909) and stores the sum in the storage unit (not shown) as a new photometric value. The aperture motor driving unit 106 also compares the newly calculated photometric value with the already stored preceding photometric value (step S910). If the difference between them has a predetermined value or more (YES in step S911), the aperture motor driving unit 106 waits up to the blanking period after partial region readout (step S912). When the blanking period starts, the aperture motor driving unit 106 controls an aperture motor 105 to move an aperture unit 102 in accordance with the calculated photometric value such that an appropriate exposure state is obtained (step S913). The exposure state is corrected by the aperture control. For example, if the determination result in step S907 indicates that the difference value exceeds the threshold value on the − side, the aperture is controlled in the + direction. If the difference value exceeds the threshold value on the + side, the aperture is controlled in the − direction.

If the difference between the current and preceding photometric values is smaller than the predetermined value in step S911 (NO in step S911), the process ends without aperture motor control.

The process sequence of an image luminance control operation will be described next with reference to FIG. 10. The image luminance control according to the second embodiment is performed for both the full-pixel region and the partial regions. More specifically, the above-described adjustment based on an exposure adjustment value is necessary in the full-pixel region. The process in each partial region is the same as in FIG. 5 used to describe the first embodiment. Only the process to be executed in the full-pixel region will be explained here.

In full-pixel region readout (YES in step S1001), the second exposure state detection unit 110 determines whether adjustment based on an exposure adjustment value has been performed in aperture control by the aperture motor driving unit 106. If adjustment has been performed (YES in step S1002), the second exposure state detection unit 110 controls at least one of a shutter speed control unit 108 and a gain adjustor 112 to adjust exposure, thereby canceling the adjustment value (step S1003). If adjustment has not been performed (NO in step S1002), the process ends directly.

FIG. 11 shows an example of the outline of exposure control according to the second embodiment. In this example, 11a indicates difference values (from the full-pixel region) before aperture control. In this case, the difference value in a region A falls within the range of a threshold value A. However, the difference value in a region B exceeds the threshold value B. Additionally, 11b indicates difference values after aperture control. Since the exposure value in the full-pixel region is controlled in the + direction, the difference value in the region B becomes smaller than the threshold value B.

As described above, according to the second embodiment, the difference between the photometric value in the full-pixel region and that in each partial region are obtained. If at least one of the difference values falls outside the threshold value range, the exposure of the full-pixel region is corrected. This makes it possible to obtain an image in optimum exposure while preventing degradation in image quality, as in the first embodiment.

The third embodiment will be described next. The third embodiment is a modification of the second embodiment, which calculates an exposure adjustment value to minimize the sum of the absolute values of difference values calculated in a plurality of partial regions.

Figure 12:
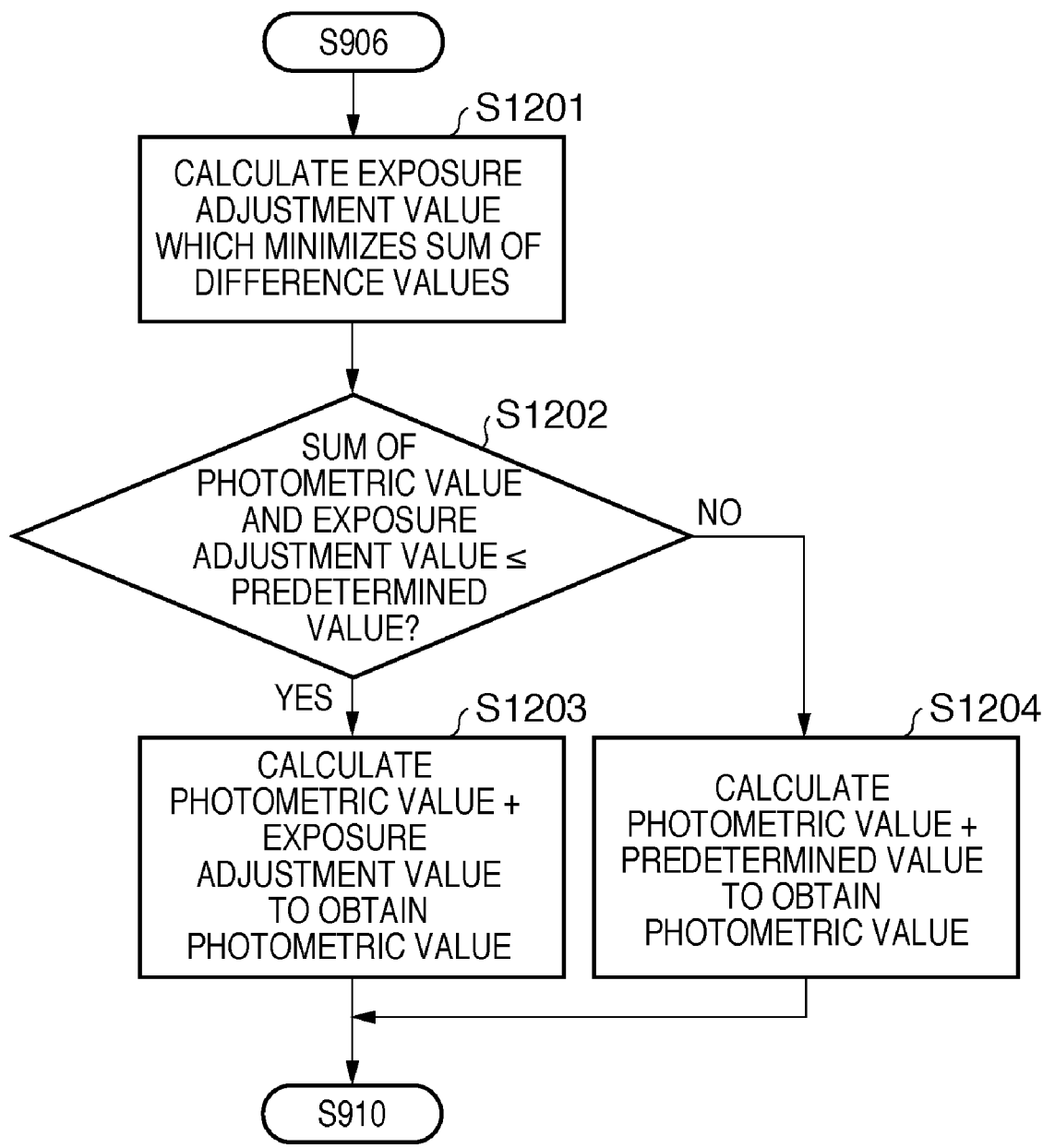
FIG. 12 is a flowchart illustrating an example of the process sequence of the exposure control operation of an image sensing apparatus 10.

An example of the process sequence of an exposure control operation according to the third embodiment will be described with reference to FIG. 12. The process in steps S901 to S906 is the same as in FIG. 9 used to describe the second embodiment, and a description thereof will not be repeated. The process from step S1201 will be explained here.

When the photometric value in the full-pixel region, and the difference value between the photometric value and that in each partial region are calculated in the process up to step S906 (YES in step S906), an aperture motor driving unit 106 calculates an exposure adjustment value (step S1201). This calculation enables to obtain an exposure adjustment value that can minimize the sum of the absolute values of difference values calculated in the partial regions (or make the sum smaller than a predetermined value). Assume that difference values in partial regions indicated by 13a in FIG. 13 are obtained. As indicated by 13a, the difference values in partial regions A, B, and C are −0.3, +0.3, and +0.7, respectively. The sum of the absolute values of the difference values is |−0.3|+|+0.3|+|+0.7|=1.3. To minimize the sum of the absolute values of the difference values, the exposure value for the full-pixel region is shifted by +0.3, as indicated by 13b in FIG. 13. Then, the sum of the absolute values of the difference values is |−0.6|+|0.0|+|+0.4|=1.0. That is, the adjustment value is +0.3 in this case.

Next, the aperture motor driving unit 106 determines whether the sum of the exposure adjustment value and the photometric value calculated in step S902 falls within a predetermined range (step S1202). If the sum falls within the predetermined range (YES in step S1202), the photometric value calculated in step S902 is added to the exposure adjustment value calculated in step S1201 to obtain a new photometric value (step S1203). If the sum falls outside the predetermined range, that is, exceeds the predetermined range (NO in step S1202), a predetermined value is added to the photometric value calculated in step S902 to obtain a new photometric value (step S1204). The process in steps S1202 to S1204 is performed to prevent degradation in image quality that occurs when adjustment is executed to a predetermined level or more by the image luminance adjustment operation in the full-pixel region. The process from step S910 is the same as in the second embodiment, and a description thereof will not be repeated. The image luminance control operation is also the same as in the second embodiment, and a description thereof will not be repeated.

As described above, according to the third embodiment, an exposure adjustment value is obtained to minimize the sum of the absolute values of the difference values (between the photometric value in the full-pixel region and those calculated in the plurality of partial regions), and the same control as in the second embodiment is performed using the adjustment value. This makes it possible to obtain an image in optimum exposure while preventing degradation in image quality, as in the second embodiment.

The fourth embodiment will be described next. The fourth embodiment is a modification of the third embodiment. A case will be explained in which the intermediate value between two (maximum and minimum values in this embodiment) of difference values calculated in a plurality of partial regions is calculated as an exposure adjustment value.

An example of the process sequence of an aperture control operation according to the fourth embodiment will be described with reference to FIG. 12. The process except step S1201 is the same as in FIG. 12 used to describe the third embodiment, and a description thereof will not be repeated. The process in step S1201 will be explained here. In the process of step S1201 of the fourth embodiment, a value at an intermediate point between the maximum and minimum values of difference values is calculated as an exposure adjustment value. More specifically, the intermediate value between the minimum and maximum values of a plurality of difference values which are obtained as the differences between the photometric value in the full-pixel region and those in the partial regions is calculated.

FIG. 14 shows an example of the outline of exposure control according to the fourth embodiment.

In this example, 14a indicates difference values (from the full-pixel region) before aperture control. The difference values in partial regions A, B, and C are −0.3, +0.3, and +0.7, respectively. At this time, the difference between the maximum and minimum values of the difference values is {(+0.7)−(−0.3)}=1.0. Hence, the intermediate value is 1.0/2=0.5. The exposure adjustment value is (−0.3)+(+0.5)=+0.2. When the difference values indicated by 14a are shifted in the + direction by +0.2, difference values indicated by 14b are obtained.

As described above, according to the fourth embodiment, the exposure adjustment value to adjust the image luminance can be smaller. This makes it possible to obtain an image in optimum exposure while preventing degradation in image quality, as in the second and third embodiments.

The fifth embodiment will be described next. In the first to fourth embodiments, exposure control is performed by focusing on the difference values calculated in the plurality of partial regions. In the fifth embodiment, a case will be explained in which control is performed by focusing on not only the difference values but also the electronic shutter speed in each partial region.

An image sensing apparatus 10 of the fifth embodiment is different from the image sensing apparatus 10 of the second embodiment shown in FIG. 7 in that an aperture motor driving unit 106 and a shutter speed control unit 108 exchange information. FIG. 7 indicates it by dotted lines. This information exchange makes the aperture motor driving unit 106 perform aperture control in consideration of the electronic shutter speed.

Figure 15:
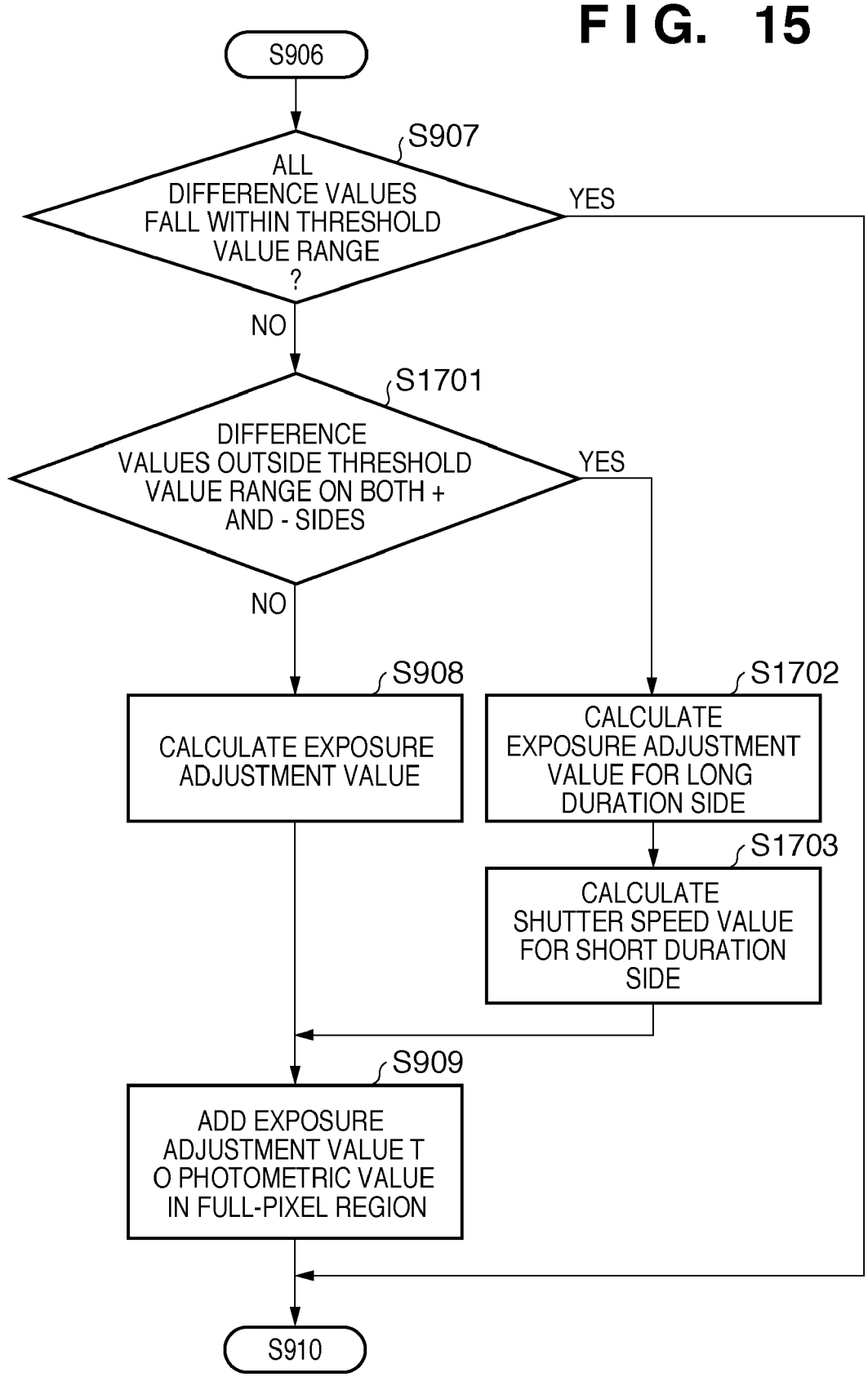
FIG. 15 is a flowchart illustrating an example of the process sequence of the exposure control operation of the an image sensing apparatus 10.

An example of the process sequence of an exposure control operation according to the fifth embodiment will be described next with reference to FIG. 15. The process except steps S1701 to S1703 is the same as in FIG. 9 used to describe the second embodiment, and a description thereof will not be repeated. The process in steps S1701 to S1703 will be explained here.

When the difference value calculation process has ended in all partial regions (YES in step S906), the aperture motor driving unit 106 determines in step S907 whether the difference values between the photometric value in the full-pixel region and those in the plurality of partial regions fall within a predetermined threshold value range. If at least one of the difference values falls outside the threshold value range (NO in step S907), the aperture motor driving unit 106 determines whether the difference values which fall outside the threshold value range exist on both the + and − sides. If the difference values exist on both sides (YES in step S1701), an exposure adjustment value is calculated for the long duration side (a region where the photometric value is smaller than that in the full-pixel region outside the threshold value range) (step S1702). For the short duration side (a region where the photometric value is larger than that in the full-pixel region outside the threshold value range), a shutter speed to make the difference value fall within the threshold value range after adjustment is calculated (step S1703). If the difference values exist on neither of the + and − sides (NO in step S1701), an exposure adjustment value is calculated in the same way as in step S908 of FIG. 7 used to describe the second embodiment. In the region on the long duration side, image sensing is done using a shutter time longer than on the other side. In the region on the short duration side, image sensing is done using a shutter time shorter than on the other side. The shutter speed calculated in step S1703 is used in an image luminance control operation (FIG. 5) in partial region readout.

FIG. 16 shows an example of the outline of exposure control according to the fifth embodiment.

In this example, 16a indicates difference values (from the full-pixel region) and shutter speeds before aperture control. In this case, the difference values in both regions A and B fall outside the threshold value range. The shutter speeds in the regions A and B are 1/30 and 1/100, respectively. Giving priority to the region A on the long duration side, exposure in the full-pixel region is adjusted to the + side. At this time, the difference value in the region B remains outside the threshold value range without changing the shutter speed. However, as indicated by 16b, it can fall within the threshold value range if the shutter speed is increased to 1/250.

As described above, according to the fifth embodiment, it is possible to cope with a case in which the calculated difference values between the photometric value in the full-pixel region and those in the partial regions fall outside the threshold value range on both the + and − sides. This makes it possible to obtain an image in optimum exposure while preventing degradation in image quality, as in the above-described embodiments.

Examples of typical embodiments of the present invention have been described above. However, the present invention is not limited to the embodiments illustrated and described above, and can be modified as needed without departing from the spirit and scope of the invention. For example, some or all of the first to fifth embodiments may be combined.

The present invention can be realized by executing the following process. That is, in the process, a software (program) that realizes the functions of the above-described embodiment(s) is supplied to the system or apparatus via a network or a computer-readable storage medium of various types, and then a computer of the system or apparatus (or devices such as CPU or MPU) reads out the program and executes it. In such a case, the program and the computer-readable storage medium where the program is stored are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-185290, filed on Jul. 16, 2008, which is hereby incorporated by reference herein in its entirety.

What is claimed is:

1. An imaging control apparatus comprising:

an input unit configured to input an image signal from an image capturing unit for a first region and an image signal from the image capturing unit for a second region included in the first region;

an aperture control unit configured to control, based on a first image signal from the image capturing unit for the first region, a mechanical component which controls an aperture for image capturing by the image capturing unit, after the first image signal for the first region and a second image signal for the second region are captured by the image capturing unit, in order to capture a third image signal for the first region in a state where the aperture for image capturing is controlled based on the first image signal for the first region; and a luminance control unit configured to electronically control, based on the first image signal for the first region and the second image signal for the second region, a luminance of a fourth image signal captured by the image capturing unit for the second region in a state where the aperture for image capturing is controlled by the aperture control unit based on the first image signal.

2. The apparatus according to claim 1, wherein said aperture control unit controls the mechanical component based on an exposure state in the first region corresponding to the first image signal, and said luminance control unit electronically controls the luminance of the fourth image signal based on the exposure state in the first region and an exposure state in the second region.

3. The apparatus according to claim 1, wherein said luminance control unit controls, based on the first image signal and the second image signal, an exposure period when the image sensing unit outputs the fourth image signal for the second region.

4. The apparatus according to claim 1, wherein said input unit controls the image capturing unit so as to alternately repeatedly output an image signal for the first region and an image signal for the second region.

5. An imaging control method of an imaging control apparatus, comprising:
- inputting an image signal from an image capturing unit for a first region and an image signal from the image capturing unit for a second region included in the first region;
- controlling, based on a first image signal from the image capturing unit for the first region, a mechanical component which controls an aperture for image capturing by the image capturing unit, after the first image signal for the first region and a second image signal for the second region are captured by the image capturing unit, in order to capture a third image signal for the first region in a state where the aperture for image capturing is controlled based on the first image signal for the first region; and
- electronically controlling, based on the first image signal for the first region and the second image signal for the second region, a luminance of a fourth image signal captured by the image capturing unit for the second region in a state where the aperture for image capturing is controlled based on the first image signal.

6. The method according to claim 5, wherein
- in the controlling step, the mechanical component is controlled based on an exposure state in the first region corresponding to the first image signal, and
- in the electronically controlling step, the luminance of the fourth signal is electronically controlled based on the exposure state in the first region and an exposure state in the second region.

7. The method according to claim 5, wherein in the electronically controlling step, an exposure period when the image sensing unit outputs the fourth image signal for the second region is controlled based on the first image signal and the second image signal.

8. The method according to claim 5, wherein
- in the inputting step, the image capturing unit is controlled so as to alternately repeatedly output an image signal for the first region and an image signal for the second region.

9. A non-transitory computer-readable storage medium storing a computer program for imaging control, the program comprising:
- inputting, an image signal from an image capturing unit for a first region and an image signal from the image capturing unit for a second region included in the first region;
- controlling, based on a first image signal from the image capturing unit for the first region, a mechanical component which controls an aperture for image capturing by the image capturing unit, after the first image signal for the first region and a second image signal for the second region are captured by the image capturing unit, in order to capture a third image signal for the first region in a state where the aperture for image capturing is controlled based on the first image signal for the first region; and
- electronically controlling, based on the first image signal for the first region and the second image signal for the second region, a luminance of a fourth image signal captured by the image capturing unit for the second region in a state where the aperture for image capturing is controlled based on the first image signal.

10. The medium according to claim 9, wherein
- in the controlling step, the mechanical component is controlled based on an exposure state in the first region corresponding to the first image signal, and
- in the electronically controlling step, the luminance of the fourth signal is electronically controlled based on the exposure state in the first region and an exposure state in the second region.

11. The medium according to claim 9, wherein in the electronically controlling step, an exposure period when the image sensing unit outputs the fourth image signal for the second region is controlled based on the first image signal and the second image signal.

12. The medium according to claim 9, wherein
- in the inputting step, the image capturing unit is controlled so as to alternately repeatedly output an image signal for the first region and an image signal for the second region.

* * * * *